(No Model.) 3 Sheets—Sheet 1.
E. B. TEMPLE & J. W. MEIGS.
MACHINE FOR GRINDING SPECTACLE AND EYEGLASS LENSES.
No. 475,068. Patented May 17, 1892.
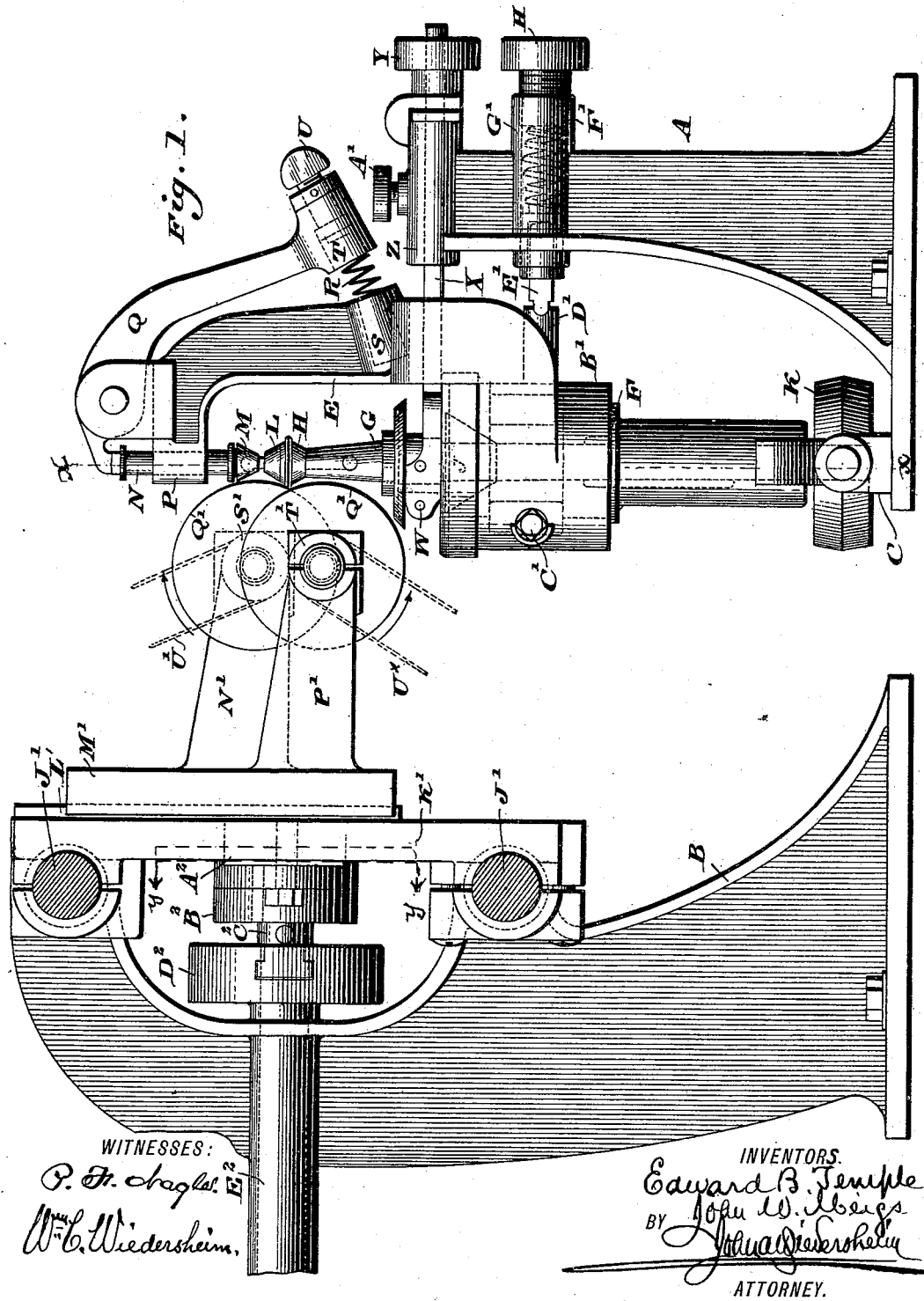
WITNESSES:
P. H. Chaples
W. C. Wiedersheim.
INVENTORS.
Edward B. Temple
John W. Meigs
BY Joshua Wiedersheim
ATTORNEY.

(No Model.) 3 Sheets—Sheet 2.
E. B. TEMPLE & J. W. MEIGS.
MACHINE FOR GRINDING SPECTACLE AND EYEGLASS LENSES.
No. 475,068. Patented May 17, 1892.
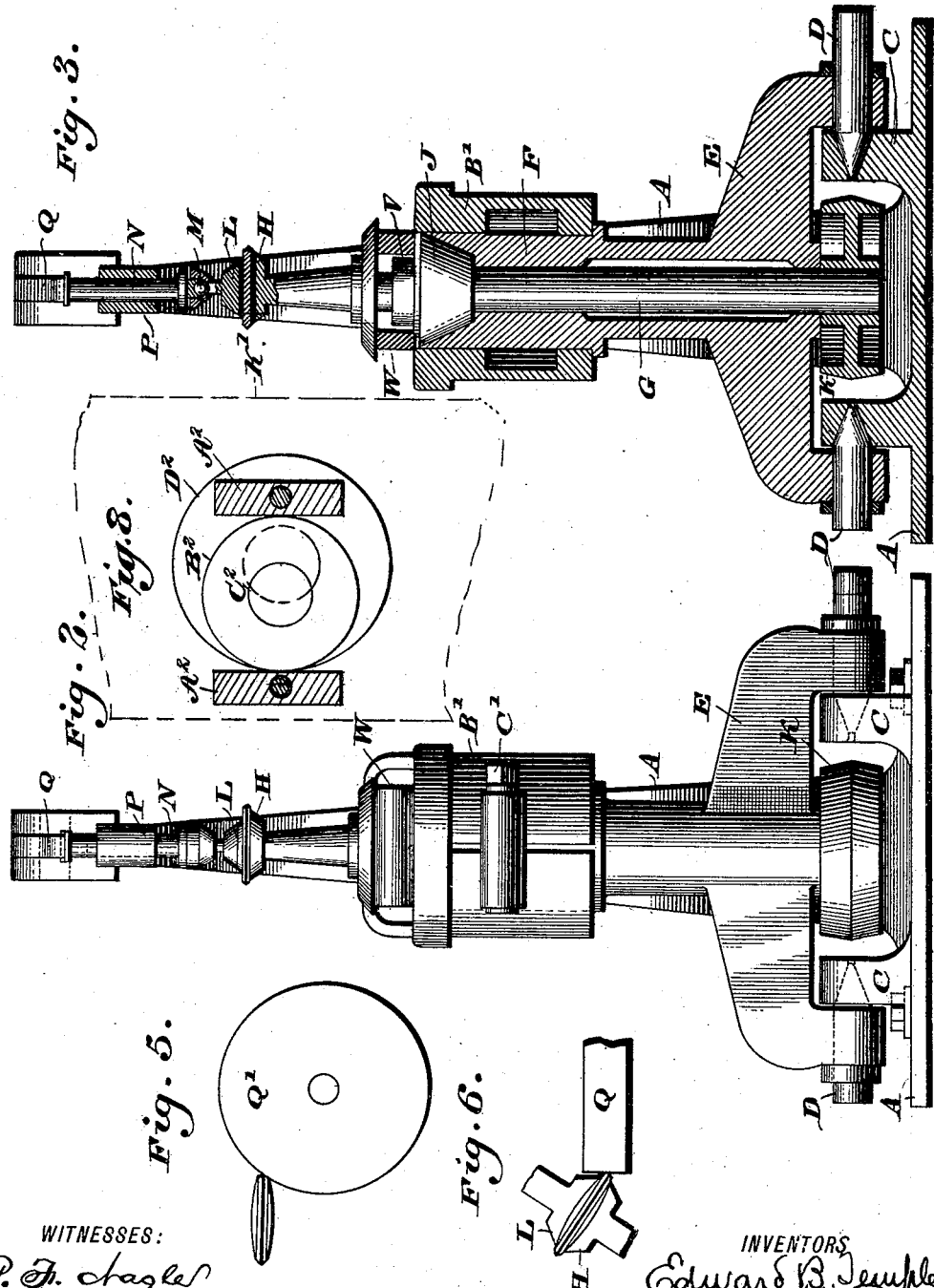
WITNESSES:
INVENTORS
Edward B. Temple
John W. Meigs
BY
ATTORNEY.

(No Model.) 3 Sheets—Sheet 3.
E. B. TEMPLE & J. W. MEIGS.
MACHINE FOR GRINDING SPECTACLE AND EYEGLASS LENSES.
No. 475,068. Patented May 17, 1892.
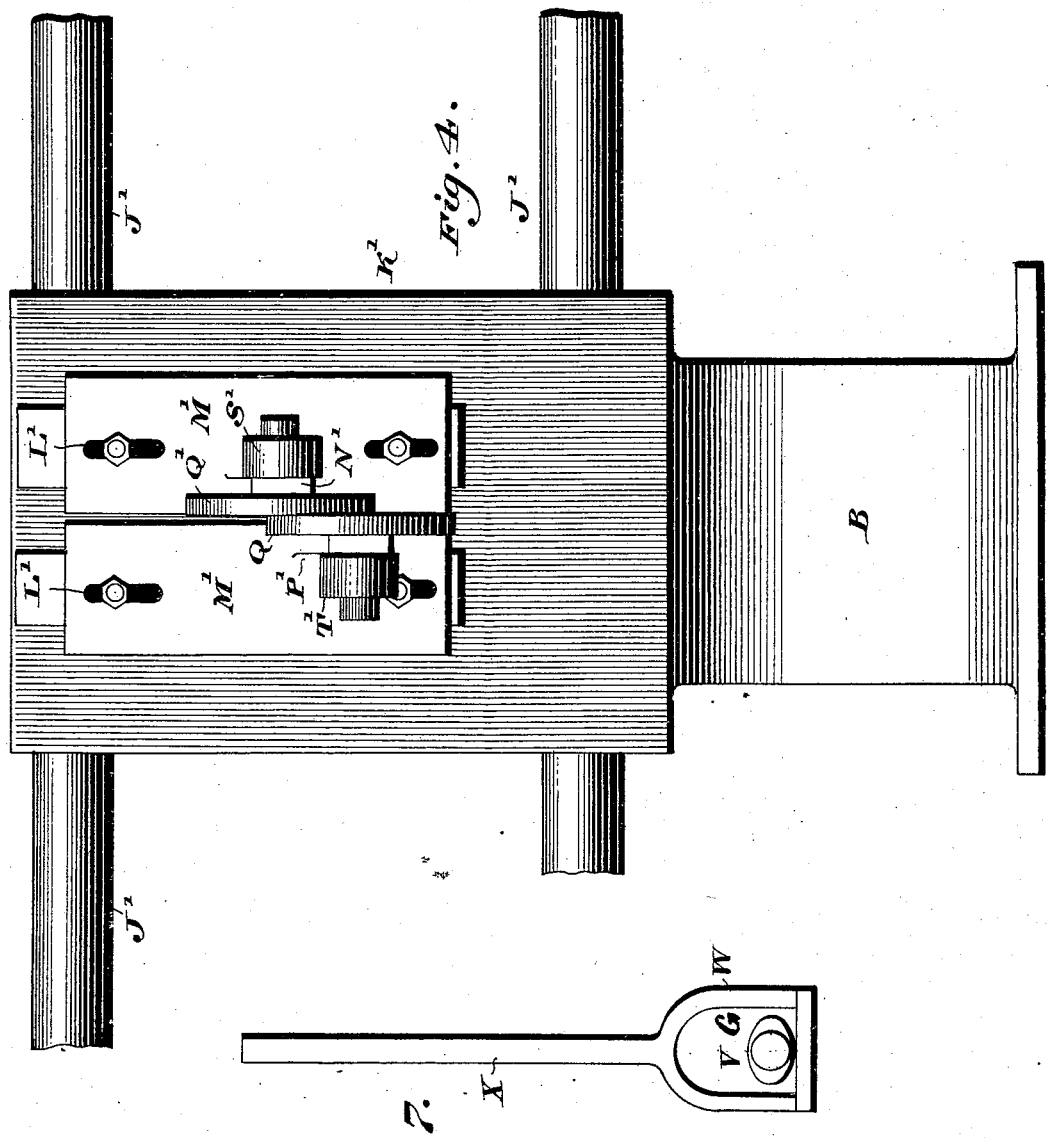

UNITED STATES PATENT OFFICE.

EDWARD B. TEMPLE, OF PHILADELPHIA, AND JOHN W. MEIGS, OF READING, PENNSYLVANIA.

MACHINE FOR GRINDING SPECTACLE AND EYEGLASS LENSES.

SPECIFICATION forming part of Letters Patent No. 475,068, dated May 17, 1892.

Application filed August 31, 1891. Serial No. 404,270. (No model.)

*To all whom it may concern:*

Be it known that we, EDWARD B. TEMPLE, of the city and county of Philadelphia, and JOHN W. MEIGS, of Reading, in the county of Berks, State of Pennsylvania, both citizens of the United States, have invented a new and useful Improvement in Machines for Grinding Spectacle and Eyeglass Lenses, which improvement is fully set forth in the following specification and accompanying drawings.

Our invention consists of a machine for grinding the edges of spectacle and eyeglass lenses, so as to adapt them for the frames thereof.

Figure 1 represents a side view of a machine for grinding the edges of spectacle and eyeglass lenses embodying our invention. Fig. 2 represents a view of a portion of the device at a right angle to that shown in Fig. 1. Fig. 3 represents a vertical section on line $x\,x$, Fig. 1. Fig. 4 represents a front view in elevation of the grinding mechanism of the machine. Figs. 5 and 6 represent views showing the lenses and the grinders in different positions. Fig. 7 represents a plan view of a slotted or forked bar employed in imparting elliptical motion to the rotatable shaft of the lower lens-holder. Fig. 8 represents a face view of the operating mechanism for the frame carrying the supports or bearings for the grinders.

Similar letters of reference indicate corresponding parts in the several figures.

Referring to the drawings, A designates a standard, to which the portions of the machine for holding the lenses to be ground are secured, and B a standard to which the grinding devices are connected. In the step C, connected with the base of the standard A, are mounted the journals D of the bifurcated lower end of a frame or bracket E, having a tubular portion F, in which a rotatable shaft or spindle G, carrying at its upper end one of the glass or lens holders H, is supported by means of an enlarged conical portion J of the spindle resting in a corresponding conical recessed portion in said tubular part F of the bracket. A pulley or wheel K on the shaft serves to communicate rotary motion to the same. The upper lens-holder L, which, like the lower holder H, is composed of an elastic substance or pad, is connected by a ball-and-socket joint M with a spindle N, having a bearing in an arm P of the bracket E, and is depressed, so as to hold the glass in place, by means of the lever Q, which is pivoted to the bracket E, and has one limb bearing against the upper end of the spindle N and the other end in contact with a coil-spring R, which bears against the said bracket, and has its ends secured in sockets S and T on said bracket and lever, respectively, a screw U in said lever serving to adjust the tension of said spring. To cause an oscillating movement to be imparted to said lower spindle G, so that an elliptical glass or lens may be ground, the said spindle G is provided with a cam V, which rotates within a yoke or slotted end W of a bar X, adjustable laterally by means of a screw Y, bearing against its end in a boss Z on the standard A. A screw A' clamps the bar X when adjusted in position. To keep the spindle G in such position that the holders H and L will present the edge of the glass at all times against the grinders, the frame or bracket E has secured thereto a split collar B', having a tightening-screw C' and an arm D', the latter being in contact with a sliding bar E', movable in one end of a boss F', supported in the standard A. Within the said boss is a coil-spring G', which bears against said bar E', and an adjusting-screw H'.

On the standard B are mounted the horizontal shafts J', on which is supported the horizontally-movable frame K', the vertical tongues L' of which form guides for the adjustment of the frames M', which are provided with the arms N' P', forming bearings for the grinders Q' Q', respectively, the said grinders lapping and having their shafts one above the other, the said shafts carrying pulleys or wheels S' T', respectively, around which the belts U' U$^\times$ pass, as shown in Fig. 1, whereby motion in opposite directions is imparted to said shafts and grinders.

To adjust the frame K' on the shafts J', the said frame is provided on its back with the vertically-parallel pieces A$^2$, between which move a roller B$^2$, which is mounted on a crank-pin C$^2$, secured in an opening in a disk D$^2$, secured on the rotary shaft E$^2$, so as to rotate therewith. It will be seen that by rotating the said shaft, which is journaled in the standard B, the crank-pin C² will be moved so as to bear laterally against the pieces A², thereby moving the frame K' on the shafts J'.

In operating the machine the bar X is adjusted according to the ellipticity of the lens to be ground and is then clamped in position by the screw A'. The frames carrying the grinders are adjusted on the standard B, so that the said grinders are in proper place relative to a lens which has been secured between the holders H and L. The spindle G is then rotated by means of its pulley K, and the grinders rotated by means of the belts U' U× and the pulleys S' and T', so that the upper and lower sides of the edge of a lens are simultaneously brought in contact with the rotating grinders, the ellipticity of the lens being provided for by the cam V on the spindle, causing the glass to be moved, so that a uniform depth of edge is presented at all portions of the periphery thereof to the grinders. The coil-spring G', bar E', and arm D' keep the bracket E and spindle G in close proximity to the grinders.

In Fig. 5 is shown a lens with the grinder at right angles to the plane thereof, while in Fig. 6 the grinder is inclined.

Having thus described our invention, what we claim as new, and desire to secure by Letters Patent, is—

1. A machine for grinding spectacle or eyeglass lenses, having rotatable holders for the glass, mechanism for imparting an elliptical motion to said holders, and grinders for beveling both edges of said lens, substantially as described.

2. A machine for grinding spectacle or eyeglass lenses, having an oscillating frame carrying a spindle with a holder, a second spindle journaled in said frame and having a holder, a spring-pressed lever pivoted to said frame and bearing against said second spindle, mechanism, substantially as described, for imparting an elliptical motion to said spindles and holders, and rotary grinders adapted to bevel the opposite edges of the lens at the same time, said parts being combined substantially as described.

3. In a machine for grinding spectacle or eyeglass lenses, a standard, a bracket pivotally connected therewith, spindles journaled in said bracket and having lens-holders at their adjacent ends, a spring-controlled lever bearing against one of said spindles, mechanism, substantially as described, connected with the other spindle for imparting an elliptical motion thereto, a spring-slide bearing against said bracket, and rotary grinders, said parts being combined substantially as described.

4. In a machine for grinding spectacle or eyeglass lenses, a standard, an oscillating bracket on said standard, a spindle journaled in said bracket and having a holder thereon, a bar adjustable in said standard and having a yoke in which a cam on said spindle rotates, grinders, and a spring-slide working in said standard for keeping the lens on the holder against the grinders, substantially as described.

5. A standard having bearings for a rotary spindle carrying an eyeglass or lens holder, a spindle with holder, and a spring-slide working in a boss on the standard and bearing against the bearing for the rotary spindle, said parts being combined substantially as described.

6. In a machine for grinding spectacle or eyeglass lenses, a standard, an oscillating bracket thereon, a rotary spindle journaled in said bracket and having a lens-holder thereon, a second spindle mounted on said bracket above said first spindle at its upper end, and an adjustable spring bearing against the lower end of said lever and having a holder on its lower end, a lever pivoted to the bracket and bearing against said upper spindle, said parts being combined substantially as described.

7. In a machine for grinding spectacle and eyeglass lenses, a standard, a bracket mounted in bearings thereon, a rotary spindle journaled in said bracket, a cam on said spindle, a bar adjustable on said standard and having a yoke surrounding said cam, an arm connected with said bracket, and a spring connected with the standard and bearing against the said arm, said parts being combined substantially as described.

8. In a machine for grinding spectacle-lenses, a standard, a bracket pivotally mounted thereon, a rotary spindle journaled in said bracket, a lens-holder carried by said spindle, a cam on said spindle, a bar secured to said standard, having a yoke on its end surrounding the said cam, a shaft journaled in the upper part of the bracket, having a lens-holder on its lower end, a lever having an end bearing on the last-named shaft, and a spring bearing against said lever, said parts being combined substantially as described.

9. In a machine for grinding spectacle and eyeglass lenses, rotatable lens-holders, a standard with horizontal shafts, a frame freely mounted on said shafts, frames vertically movable on said first frame and having arms forming bearings for grinders, and mechanism for imparting a horizontal motion to said first frame, said parts being combined substantially as described.

EDWARD B. TEMPLE.
JOHN W. MEIGS.

Witnesses:
JOHN A. WIEDERSHEIM,
R. H. GRAESER.